United States Patent [19]

McCarty

[11] Patent Number: 4,857,785

[45] Date of Patent: Aug. 15, 1989

[54] TORQUE COUPLING DEVICE

[75] Inventor: Frederick B. McCarty, San Pedro, Calif.

[73] Assignee: Allied-Signal Inc., Morris Township, Morris County, N.J.

[21] Appl. No.: 242,449

[22] Filed: Sep. 9, 1988

[51] Int. Cl.⁴ .............................................. H02K 7/10
[52] U.S. Cl. ...................................... 310/78; 310/89; 310/105
[58] Field of Search ...................... 310/78, 80, 89, 92, 310/103, 105, 106; 192/84 R, 84 E

[56] References Cited

U.S. PATENT DOCUMENTS

| | | | |
|---|---|---|---|
| 3,076,905 | 2/1963 | Watson | 310/46 |
| 3,394,278 | 7/1968 | Schetinin | 310/105 |
| 3,890,515 | 6/1975 | Fehr et al. | 310/105 |
| 3,936,683 | 2/1976 | Walker | 310/103 |
| 3,943,391 | 3/1976 | Fehr | 310/103 |
| 4,013,384 | 3/1977 | Oikawa | 417/368 |
| 4,037,123 | 7/1977 | Mole et al. | 310/52 |
| 4,115,040 | 9/1978 | Knorr | 310/104 |
| 4,197,474 | 4/1980 | Honingsbaum | 310/105 |
| 4,278,907 | 7/1981 | Landgraf et al. | 310/191 |
| 4,683,392 | 7/1987 | MacDonald et al. | 310/105 |

OTHER PUBLICATIONS

Fisher, Arthur, "Superconductivity," *Popular Science*, Apr. 1988, pp. 54–58.

*Primary Examiner*—Patrick R. Salce
*Assistant Examiner*—Anita M. Ault
*Attorney, Agent, or Firm*—David B. Abel

[57] ABSTRACT

A torque coupling device of the synchronous reluctance type having a magnetic flux generating device and concentric rotors, each rotor having a sleeve of diamagnetic material including a plurality of flux windows, the diamagnetic sleeves on the two rotors cooperating to provide a reluctance gradient within a magnetic circuit, thereby variably magnetically linking the two rotors.

20 Claims, 3 Drawing Sheets

TORQUE COUPLING DEVICE

BACKGROUND OF THE INVENTION

This invention relates to a torque coupling device of the synchronous reluctance type which uses two rotors having a variable rotary shutter of diamagnetic (zero permeability) material to provide a reluctance gradient in a magnetic circuit. The reluctance gradient is the rate of change in circuit reluctance that occurs with respect to a small angular displacement of the two rotors of the coupling. This gradient produces a magnetic torque coupling force between the two rotors. Ideally, there is no sustained energy loss incurred in producing the coupling force. Of course, in the case of a magnetic field, excitation losses are sustained due to current flowing in the excitation coil. These losses may be eliminated by using a permanent magnet or a superconducting coil.

Conventional synchronous reluctance torque couplers, as for example U.S. Pat. Nos. 4,013,384 and 4,115,040, of opposite poles of permanent magnets mounted on two rotors to align to a position of minimum reluctance in a properly arranged magnetic circuit. Others include U.S. Pat. No. 3,890,515 which includes an excitation winding to magnetize salient ferromagnetic polar projections on the two rotors, which polar projections will then tend to align in a minimum reluctance magnetic circuit. For both of these types of torque couplers, the maximum change in magnetic circuit reluctance that can be realized is proportional to the height of the poles as compared to the non-pole space between the poles. The minimum reluctance that can ever be obtained is limited by the unity permeability of the space occupied by the non-poles.

A unique feature of a synchronous reluctance coupling is that it maintains a precise angular displacement between the two magnetically coupled rotors, the driver leading the driven rotor in phase by a few degrees depending on the torque and the field. The angular displacement, or phase angle, between the two rotors is independent of the speed of the rotors. It is zero when there is no torque on the driven shaft. There is a precisely discernible phase angle at which a maximum or pullout torque occurs and synchronism between the rotors is lost. The phase angle between zero and the pullout angle increases with the applied torque, but is inversely proportional to the magnetic field. For any given steady-state torque, not exceeding the pullout angle, there is no energy expenditure in the rotors, mechanical losses due to windage and bearing friction excepted. If synchronism is lost, a pulsating torque with an average value of zero is developed.

A distinction should be noted between synchronous reluctance couplings and couplings based on either the hysteresis principle or the induction principle. These other couplings develop torque as a consequence of energy losses, i.e., heating, in one of the rotors. The torque is proportional to the quotient of the rotor loss divided by the slip speed. The induction, or eddy current coupling cannot develop torque when the rotors are running synchronously. The hysteresis coupling can develop a reduced torque at synchronism; however the precise phase relationship between the rotors is indeterminant, depending on the previous torque history of the device.

The objective of the reluctance coupling designer is to provide a construction that achieves a maximum reluctance gradient with the most economical use of space and materials. If large ferromagnetic rotor poles can be replaced with thin, light-weight flux shutters, then a much improved product would result.

DISCLOSURE OF THE INVENTION

The present invention is directed to a torque coupling device for frictionles non-contact magnetic coupling of two shafts based on diamagnetic occlusion of a magnetic field. The torque coupling device preferably utilizes a D.C. excited coil, and includes two axially concentric rotors, each having a diamagnetic superconductive sleeve, the sleeves are axially concentric and interact to change the magnetic co-energy of a magnetic circuit surrounding the coil. Each sleeve includes a plurality of flux windows separated by flux shutter bars. When the flux windows of the two concentric sleeves of the rotors are aligned, lines of magnetic flux flow inside the inner rotor and magnetic co-energy of the circuit is maximized. Changing the relative angular relationship between the two rotors causes the shutter bars to cover the flux windows occluding magnetic flux, thereby reducing the magnetic co-energy, and producing a torque. The torque produced is proportional to the rate of change of co-energy with relative angular position, and is independent of the rotational speed of the rotors if the relative angular position is constant.

As in the case of salient ferromagnetic poles, the flux shutters have a tendency to align to achieve a position of minimum magnetic reluctance for the related magnetic circuit. However, in contrast to the prior art, it is expected that the flux shutter will require a relatively thin layer of diamagnetic material and that the circuit permeance can more nearly approach the ideal of zero permeance in the closed shutter position because the permeability of a diamagnetic material is zero.

The torque coupling device can be enhanced by the optional addition of ferromagnetic material within the flux windows. Thus it can combine the two different approaches to producing torque, diamagnetic occlusion and ferromagnetic conduction, but without adding space to achieve high saliency of the ferromagnetic windows. Magnetic saliency is obtained by diamagnetic occlusion as opposed to the geometric strategy of physically prominent poles.

The invention also contemplates using a sealing dome to separate and hermetically seal the environment of the first rotor from that of the second rotor. The torque coupling device can thereby be used to efficiently couple mechanical shaft power into or out of a sealed or contaminated environment, or between two vessels containing reactive compounds.

DESCRIPTION OF THE DRAWINGS

These and other aspects of the invention will become apparent from the following description taken in conjunction with the appended figures, wherein.

BEST MODE OF CARRYING OUT THE INVENTION

Figure 1:
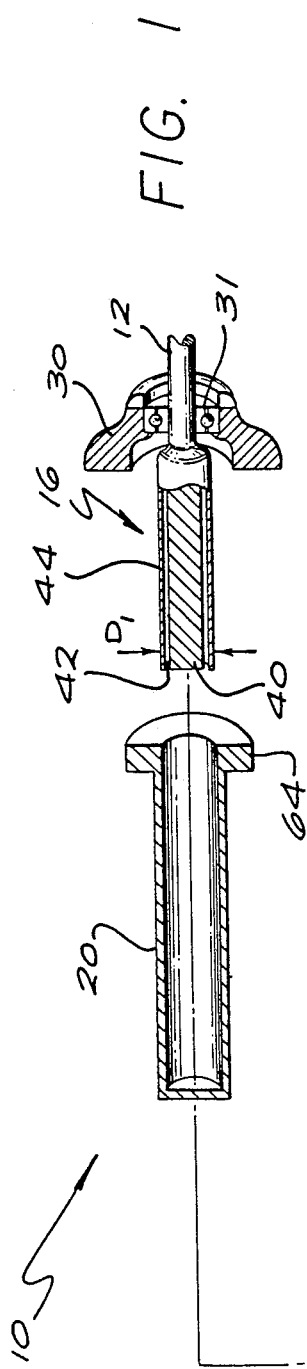
FIG. 1 is an exploded cross sectional view of a torque coupler according to the present invention.
Figure 1:
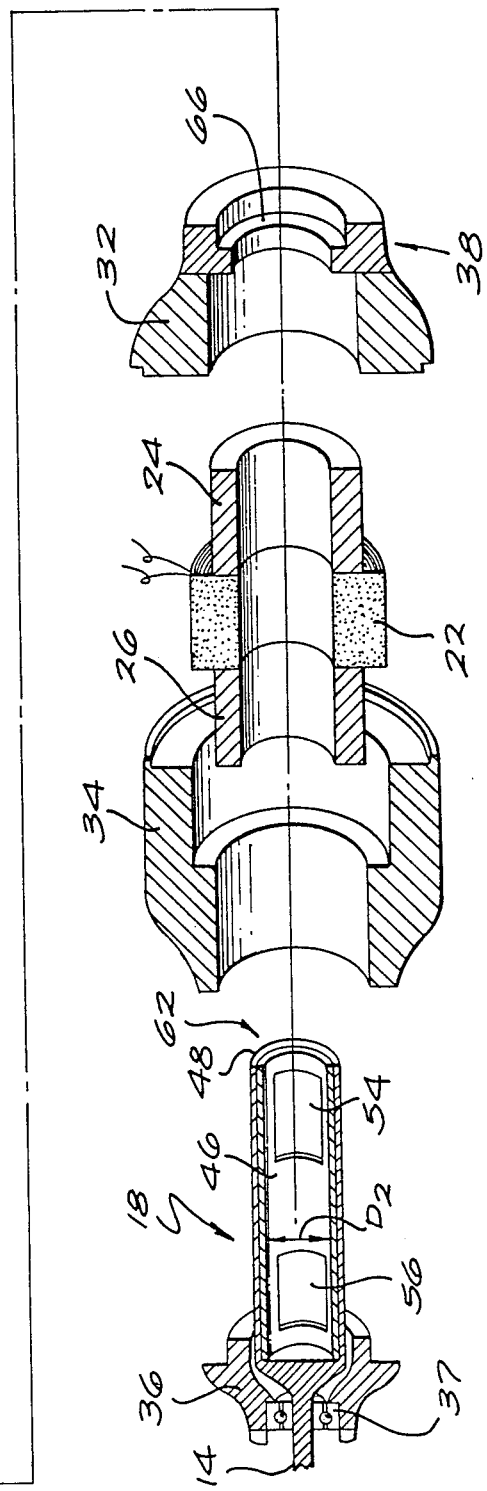
Figure 3:
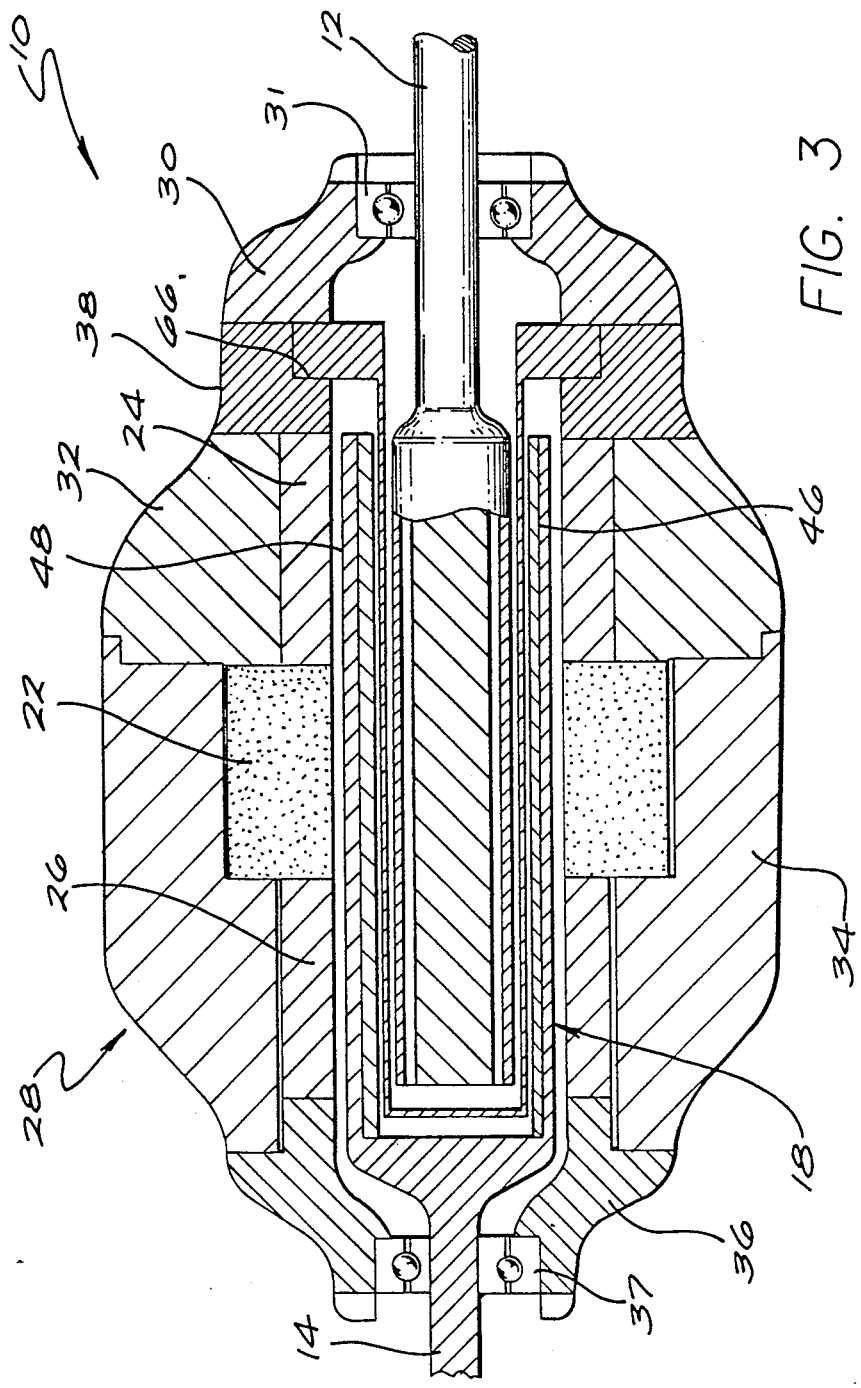
FIG. 3 is a partially cross sectional, partially perspective view of the assembled torque coupler.

FIG. 1 shows an exploded cross-sectional view of a torque coupler 10, which provides magnetic coupling between a first shaft 12 and a second shaft 14, according to the present invention. The torque coupler 10 includes a generally cylindrical first rotor 16, attached to and cantilevered from the end of the first shaft 12, and a generally cylindrical hollow second rotor 18 attached to and cantilevered from the end of the second shaft 14, the second rotor 18 being mounted axially concentric about the first rotor 16. The torque coupler 10 may also includes an hermetic sealing dome 20, which separates and isolates the first and second rotors 16, 18, as well as a toroidal coil 22 mounted between cylindrical first and second stacks of ferromagnetic disks laminated stacks 24, 26, all of which are contained within a four piece housing assembly 28 (FIG. 3) including a first end bell 30, housing members 32 and 34, and second end bell 36. It should be noted that sealing member 38 may be a section of a partition separating the two environments of the first rotor and the second rotor. First and second end bells 30 and 36 may additionally include bearings 31 and 37 respectively to support shafts 12 and 14.

The first rotor 16 includes an optional solid, preferably ferromagnetic core 40 surrounded by a thin cylindrical sleeve 42 and a retaining hoop 44 having an outer diameter of D1. The retaining hoop 44, and optionally the core 40, being secured or attached to the first shaft 12. The second rotor 18 includes a second thin cylindrical sleeve 46 contained within a second retaining hoop 48 attached to the end of the second shaft 14. The inner diameter of the second cylindrical sleeve 46 is shown as D2, and is greater than the outer diameter D1 of the first rotor 16. Both of the retaining hoops 44 and 48 are formed from a high strength non-magnetic material such as a high strength plastic or metal such as aluminum or steel. The cylindrical sleeves 42 and 46 are formed from a diamagnetic, super conducting material such as metal oxide based ceramics for example those materials having the general composition $Y\ Ba_2\ Cu_3\ O_{7-x}$. These materials have a magnetic permeability of zero, i.e., magnetic flux will not pass through the material. The core 40 within the first rotor 16 may be formed from a non-magnetic material, however, preferably the core 40 is formed from a ferromagnetic material such as iron. However, it should be pointed out that the second rotor 18 is totally void of any magnetic or ferromagnetic pole sections.

Figure 2A:
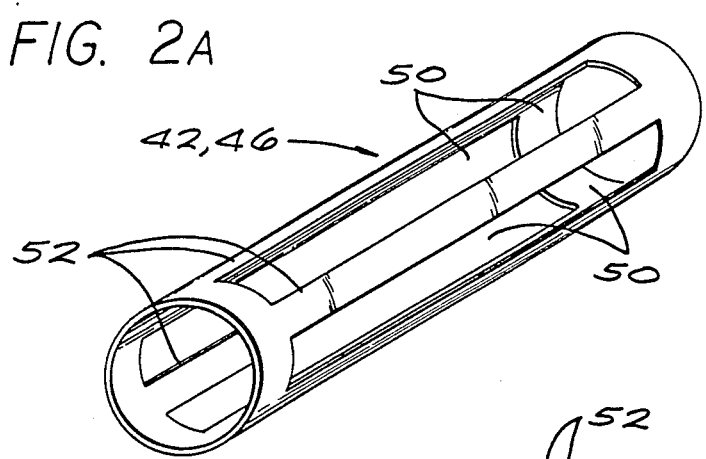
FIG. 2 comprising 2A, 2B and 2C are perspective views of three alternative configurations for the diamagnetic cylindrical sleeve elements from the torque coupler of FIG. 1.
Figure 2B:
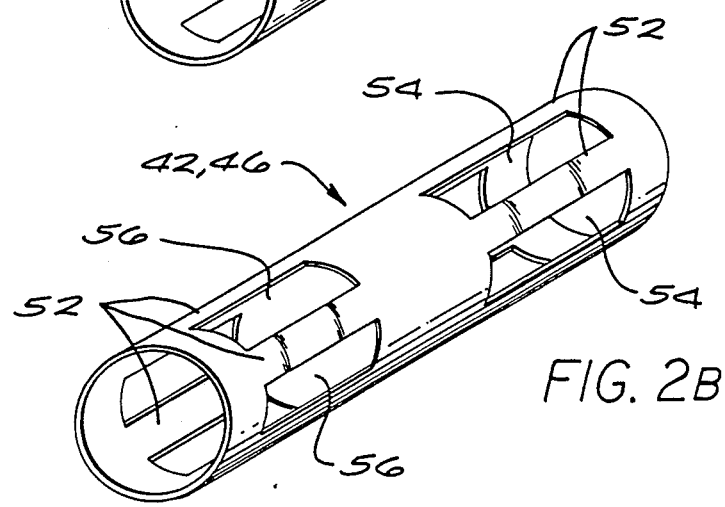

The cylindrical sleeves 42 and 46 are similar in construction except that the second cylindrical sleeve 46 has a proportionally larger diameter. FIGS. 2A and 2B show perspective views of alternate designs for cylindrical sleeves 42 and 46. Within FIG. 2A, the sleeves 42, 46 are shown as having a number of generally rectangular-shaped flux windows 50, with longer sides of the rectangle aligned with the axis of the sleeve 42 or 46. The flux windows 50 are equally spaced about the cylindrical sleeves 42, 46, separated by shutter bars 52, and extend for most of the length of the sleeves 42, 46. Typically the flux windows 50 will have a width approximately equal to the width of the shutter bars 52 which separate the flux windows 50.

FIG. 2B shows an alternate design for sleeves 42, 46 having two sets of flux windows 54 and 56, the first set of flux windows 54 located near one end of the sleeve 42 or 46 with the second set of flux windows 56 located near the opposite end of the sleeve 42, 46. The central section of the sleeve 42, 46 being left as an intact cylinder. This design reduces axial leakage of magnetic flux and is structurally superior.

Figure 2C:
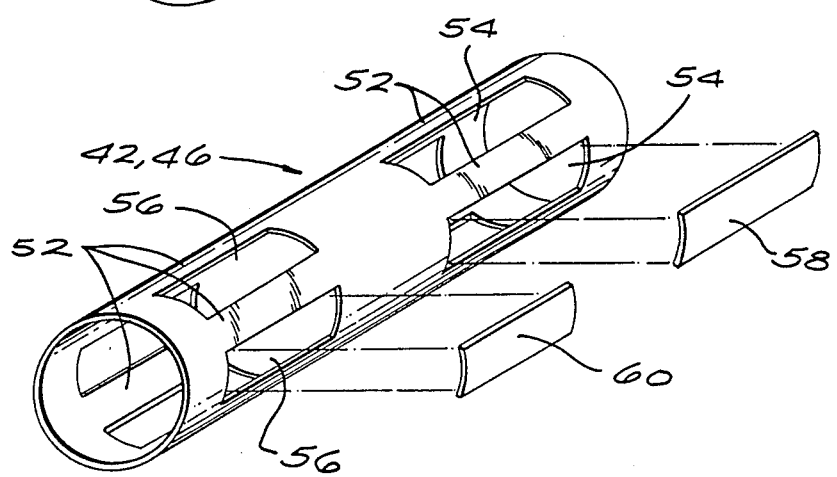

FIG. 2C shows another alternate configuration for the sleeves 42 and 46, similar to that of FIG. 2B, wherein the flux windows 54 and 56 have placed therein ferromagnetic elements 58 and 60. These ferromagnetic elements 58 and 60 enhance the magnetic circuit of the torque coupler 10 by reducing the air gap which the magnetic flux must cross.

The torque coupler 10 is assembled by first installing the toroidal coil 22 and the laminated stacks 24 and 26 within housing members 32 and 34 and attaching sealing member 38 to housing member 32. The second rotor 18 is then inserted within the cylindrical space defined by the interior diameters of the laminated stacks 24, 26 and toroidal coil 22. The hermetic sealing dome 20 is inserted from the opposite end of the housing assembly 28, into an open end 62 of second cylindrical sleeve 46 of the second rotor 18. The sealing dome 20 includes a flange 64 at its open end, the flange 64 slides into the open end of sealing member 38 and butts against an internal ring projection 66 thereof. The first rotor 16 is then inserted into the interior of the sealing dome 20. Finally, the first end bell 30 is installed over the projecting end of first rotor 16 and attached to sealing member 38, while the second end bell 36 is installed over the projecting end of second rotor 18 and attached to housing member 34.

In operation, the toroidal coil 22 is excited by a D.C. current and generates a magnetic field about itself. The housing members 32 and 34 as well as the laminated stacks 24 and 26 are all preferably formed of ferromagnetic materials, thus providing a magnetically easy path for a portion of the magnetic field circuit, with the rotors 16, 18 effectively filling the space for the remainder of the magnetic circuit passing through the center of the toroidal coil 22. When the flux windows 50 (or 54 and 56) of the cylindrical sleeves 42 and 46 are aligned, magnetic flux flows in through one end of the flux windows 50 into the ferromagnetic core 40 of first rotor 16, along core 40 the center of toroidal coil 22, and out through the other end of first rotor 16 via flux windows 50.

With the flux windows 50 of rotors 16 and 18 aligned, the magnetic co-energy of the system is at a maximum and the torque coupler is at a stable-zero torque position. Any change in the relative angular relationship between the first rotor 16 and second rotor 18 will reduce the co-energy of the magnetic circuit and produce a torque. When the rotors 16 and 18 are rotated such that the windows 50 of one rotor are covered by the magnetically impermeable shutter bars 52 of the other rotor, and vice versa, total occlusion of magnetic flux from the core 40 occurs and a second zero torque position results. However, this second zero torque position is non-stable in that the magnetic co-energy of the system is at a minimum. Thus, the torque which couples the first rotor 16 and the second rotor 18 will achieve a maximum value somewhere between the stable zero position (when the flux windows 50 are aligned) and the nonstable zero position, when the flux windows 50 are covered by shutter bars 52. Additionally, the torque (T) produced is proportional to the potential rate of change of magnetic co-energy (E) with relative angular position ($\theta$), i.e., $T \alpha dE/d\theta$. The torque is independent of rotational speed of the rotors 16, 18 if the relative angular position is constant.

It may also be appreciated that increasing the strength of the magnetic field increases the available magnetic co-energy and thus the maximum torque coupling capability of the system. Thus it is desirable to form the toroidal coil 22 from superconducting wires in order to produce a very large magnetic field strength and have a high maximum torque potential.

It should be evident from the foregoing description that the present invention provides many advantages over previous torque coupling devices. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

I claim:

1. A torque coupling device for coupling power between first and second shafts, comprising:
   a first cylindrical rotor attached to the end of said first shaft;
   a second hollow cylindrical rotor attached to the end of said second shaft and mounted axially concentric with said first rotor;
   means for producing a magnetic flux field having a segment of a preferred magnetic circuit aligned with the concentric axis of said first and second rotors; and
   means for changing the magnetic co-energy of said magnetic circuit with a change in the relative angular position of said first and second rotors by occlusion of said magnetic flux from penetrating said first cylindrical rotor.

2. The torque coupling device of claim 1 wherein said means for changing comprises:
   a first sleeve of diamagnetic material including a plurality of flux windows separated by shutter bars, said first sleeve attached for rotation with said first rotor, and
   a second sleeve of diamagnetic material including a plurality of flux windows separated by shutter bars, said second sleeve attached for rotation with said second rotor and arranged axially concentrically with said first sleeve.

3. The torque coupling device of claim 2 wherein said diamagnetic material is a metal oxide based ceramic having the general composition $Y Ba_2 Cu_3 O_{7-x}$ 4. The torque coupling device of claim 2 wherein said first cylinder rotor includes a retaining hoop enclosing said first sleeve of diamagnetic material, said retaining hoop formed from a high strength material.

5. The torque coupling device of claim 4 wherein said first cylindrical rotor further includes a core of ferromagnetic material within said first sleeve of diamagnetic material.

6. The torque coupling device of claim 2 wherein said second hollow cylindrical rotor includes a retaining hoop formed of high strength material enclosing said second sleeve of diamagnetic material.

7. The torque coupling device of claim 2 wherein said flux windows within said first sleeve and said second sleeve are generally rectangular in shape and extend substantially the length of said sleeves.

8. The torque coupling device of claim 2 wherein said first sleeve and said second sleeve each include two sets of generally rectangular shaped openings defining said flux windows, one set of flux windows located near one end and the other set of flux windows located near the opposite end of said first and second sleeves.

9. The torque coupling device of claim 2 further comprising: a plurality of ferromagnetic elements placed within said flux windows of said first sleeve and said second sleeve.

10. The torque coupling device of claim 2 wherein said first sleeve and said second sleeve are made from a material having a magnetic permeability approximately equal to zero.

11. The torque coupling device of claim 1 further comprising:
    housing means for containing said means for producing said magnetic field and said first and second rotors.

12. The torque coupling device of claim 1 wherein said means for producing said magnetic flux field comprises:
    a toroidal shaped direct current excited toroidal coil.

13. The torque coupling device of claim 12 wherein said coil is formed using superconducting wire.

14. The torque coupling device of claim 1 further comprising:
    an hermetic sealing dome located between said first rotor and said second rotor to separate the environment of said first rotor from the environment of said second rotor.

15. A torque coupling device for coupling power between first and second shafts comprising:
    a first rotor attached to an end of said first shaft, said first rotor including a sleeve of diamagnetic material having a plurality of flux windows, said sleeve surrounding a core of ferromagnetic material, said sleeve and said core being contained within a hoop of high strength non-magnetic material;
    a second rotor attached to an end of said second shaft, said second rotor including a sleeve of diamagnetic material having a plurality of flux windows enclosed within a hoop of high strength material, said second rotor mounted axially concentric with said first rotor; and
    means for producing a magnetic flux having a segment of a preferred magnetic circuit aligned and axially concentric with said first and second rotors, said magnetic flux acting upon said first and second rotors to maintain magnetic coupling of said first rotor and said second rotor.

16. The torque coupling device of claim 15 wherein said means for producing said magnetic flux comprises a direct current excited toroidal coil.

17. The torque coupling device of claim 15 further comprising:
    a means for environmentally isolating said first rotor from said second rotor.

18. The torque coupling device of claim 15 further comprising:
    a housing assembly to contain said first and second rotors and said means for producing said magnetic flux, said housing assembly including a central section of two ferromagnetic members located between two non-magnetic end sections.

19. The torque coupling device of claim 18 wherein said housing assembly further comprises an hermetic sealing member, located between said ferromagnetic members and one of said non-magnetic end sections, said hermetic sealing member having a section configured to separate and partition the environment of said first rotor from the environment of said second rotor.

20. A method of coupling torque between a first shaft and a second shaft, comprising:

attaching a first rotor to an end of the first shaft, said first rotor including a sleeve of diamagnetic material having a plurality of flux windows;

attaching a second rotor to an end of the second shaft, said second rotor including a sleeve of diamagnetic material having a plurality of flux windows;

positioning said second rotor axially concentric with said first rotor;

generating a magnetic flux having a segment of a preferred magnetic circuit aligned axially concentric with said first and second rotors, said magnetic flux tending to align said flux windows of said second rotor with said flux windows of said first rotor; and producing a torque between said first rotor and said second rotor by variably occluding magnetic flux penetration of said first rotor and decreasing magnetic co-energy of said magnetic circuit with any change in relative angular position of said first rotor with respect to said second rotor.

* * * * *